(12) United States Patent
Uretsky et al.

(10) Patent No.: US 12,071,312 B2
(45) Date of Patent: Aug. 27, 2024

(54) LUGGAGE LOADING SYSTEM

(71) Applicant: ISRAEL AEROSPACE INDUSTRIES LTD., Lod (IL)

(72) Inventors: Mark Uretsky, Netanya (IL); Ofer Moldovan, Beit Hashmonay (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 448 days.

(21) Appl. No.: 17/424,632

(22) PCT Filed: Jan. 22, 2020

(86) PCT No.: PCT/IL2020/050088
§ 371 (c)(1),
(2) Date: Jul. 21, 2021

(87) PCT Pub. No.: WO2020/152681
PCT Pub. Date: Jul. 30, 2020

(65) Prior Publication Data
US 2022/0097982 A1    Mar. 31, 2022

(30) Foreign Application Priority Data

Jan. 24, 2019  (IL) .......................................... 264457

(51) Int. Cl.
*B65G 47/54*    (2006.01)
*B64F 1/32*    (2006.01)
*B65G 21/20*    (2006.01)

(52) U.S. Cl.
CPC .............. *B65G 47/54* (2013.01); *B64F 1/324* (2020.01); *B65G 21/2072* (2013.01); *B65G 2201/0264* (2013.01)

(58) Field of Classification Search
CPC . B64F 1/368; B64F 1/32; B64F 1/324; B65G 67/00; B65G 65/00; B65G 47/54;
(Continued)

(56) References Cited

U.S. PATENT DOCUMENTS 3,838,763 A   10/1974  Davey et al.
4,832,203 A   5/1989   Nozawa
(Continued)

FOREIGN PATENT DOCUMENTS

CN    104640792 A    5/2015
CN    108883438 A    11/2018
(Continued)

*Primary Examiner* — Glenn F Myers
(74) *Attorney, Agent, or Firm* — Dorsey & Whitney LLP

(57) ABSTRACT

A system for loading articles into a container is provided, comprising a platform unit and an elevator unit configured to adjust its elevation relative to the container and a platform unit comprising an opening facing the container and defining an edge of the platform unit, a transfer arrangement comprising a plurality of parallel independent transfer members defining a receiving surface and extending along a loading direction transverse to the edge and configured to move of the others, and a positioning arrangement to orient the article to a loading orientation on the receiving surface and position it at a predetermined loading position along an axis perpendicular to the loading direction. The transfer arrangement is configured to extend a subset of the transfer members in the loading direction through the opening, thereby facilitating placement of the article at a predetermined location within the container.

20 Claims, 4 Drawing Sheets

(58) Field of Classification Search
CPC .......... B65G 21/2072; H01L 21/68707; H01L 21/68771; H01L 21/67763; H01L 21/67766; H01L 21/67775; H01L 21/6779; H01L 21/67784; H01L 21/67787; H01L 21/67796; H01L 21/67748; H01L 21/67736; H01L 21/6773
USPC ........................................................ 414/567
See application file for complete search history.

(56) References Cited

U.S. PATENT DOCUMENTS

| | | | | |
|---|---|---|---|---|
| 4,962,841 | A * | 10/1990 | Kloosterhouse | B65G 47/54 198/370.09 |
| 8,622,199 | B2 * | 1/2014 | Windfeld | B65G 47/71 198/588 |
| 2002/0159869 | A1 * | 10/2002 | Fukuhara | B64F 1/3055 414/398 |
| 2008/0018337 | A1 | 1/2008 | Carmichael et al. | |
| 2010/0145502 | A1 | 6/2010 | Kratzmaier | |
| 2010/0278625 | A1 | 11/2010 | Wolkerstorfer | |
| 2013/0287538 | A1 | 10/2013 | Nyquist | |
| 2015/0151931 | A1 | 6/2015 | Cavelius | |
| 2019/0135542 | A1 * | 5/2019 | Itoh | B65G 43/08 |
| 2019/0237351 | A1 * | 8/2019 | Krupyshev | H01L 21/67754 |

FOREIGN PATENT DOCUMENTS

| | | |
|---|---|---|
| DE | 10012090 A1 | 9/2001 |
| DE | 10015778 A1 | 10/2001 |
| DE | 102010017572 A1 | 12/2011 |
| DE | 102012008128 A1 | 10/2013 |
| EP | 1980490 A2 | 10/2008 |
| EP | 2581330 A1 | 4/2013 |
| JP | S5239491 A | 3/1977 |
| JP | S62157139 A | 7/1987 |
| JP | H08258986 A | 10/1996 |
| JP | 2013107520 A | 6/2013 |
| NL | 1023904 C2 | 1/2005 |
| WO | 2012156634 A1 | 11/2012 |

* cited by examiner

LUGGAGE LOADING SYSTEM

TECHNOLOGICAL FIELD

The present application relates to systems for autonomously loading luggage into a container, in particular those systems configured to load the luggage according to a predetermined plan.

BACKGROUND

Luggage accompanying a traveler during a flight on a commercial airline is typically stowed in a cargo section of the aircraft. As the number of pieces of luggage of all of the passengers often numbers in the dozens or hundreds, large containers, such as unit load devices (ULD's), are often provided, each to contain a large number of pieces of luggage. The luggage is arranged in the ULD's ahead of time, and then ULD's are transported and stowed in the cargo section prior to the flight. This process reduces the amount of time that the aircraft must be available for stowage of luggage thereon, as well as removal of luggage from the cargo section.

In addition, systems and methods for determining an optimal arrangement of arranging the luggage within the ULD's are known. In performing the optimization, physical parameters of each piece of luggage, e.g., its dimensions, weight, etc., are taken into account. Once an arrangement has been determined, the luggage is loaded onto the ULD's associated with the flight accordingly.

SUMMARY

According to one aspect of the presently disclosed subject matter, there is provided a system for facilitating loading of articles into a container, the system comprising a platform unit and an elevator unit configured to adjust its elevation relative to the container, the platform unit comprising:
  an opening for facing the container and defining a container-facing edge of the platform unit;
  a transfer arrangement comprising a plurality of parallely-arranged transfer members, each transfer member extending along a loading direction being transverse to the container-facing edge and being configured to move independently of the others, upper surfaces of the transfer members defining a receiving surface of the platform unit configured for receipt thereon of at least one of the articles; and
  a positioning arrangement configured to orient the article to a predetermined loading orientation on the receiving surface and position it at a predetermined loading position along an axis perpendicular to the loading direction;
wherein the transfer arrangement is configured to extend a subset of the transfer members in the loading direction through the opening, thereby facilitating placement of the article at a predetermined location within the container.

The subset may be limited to those transfer members supporting the article when extended.

The system may be configured to retract the transfer members one at a time once the article has been placed at the predetermined location.

The system may be configured to lower each of the transfer members before its retraction.

Each of the transfer members may comprise a conveyor arrangement configured to transfer an article thereupon along the loading direction.

The positioning arrangement may comprise a pair of guide members extending in the loading direction and facing one another, the positioning arrangement being configured to selectively extend and retract the guide members in a direction transverse to the loading direction.

The positioning arrangement may comprise an actuating arrangement configured to facilitate the extension and retraction of each of the guide members.

The system may further comprise a track extending in a direction transverse to the loading direction and receiving the guide members therewithin, the actuating arrangement being configured to move the guide members within the track.

The system may further comprise an auxiliary guide member, configured to displace the article toward the opening in the loading direction, independently of the transfer members. When the system comprises the track, it may be formed in the auxiliary guide member. The guide members may be configured to compress along the loading direction, for example by telescopically collapsing.

The platform unit may further comprise a gate disposed so as to selectively open and close the opening.

The system may further comprise a rotating arrangement, configured to rotate the article to a predetermined preliminary orientation and transfer it to the platform unit.

The rotating arrangement may comprise a plurality of rollers configured to selectively rotate and laterally translate the article.

The system may further comprise one or more lateral transfer arrangements configured to move an article disposed on the subset of transfer member when extended into the container, in a lateral direction substantially perpendicular to the loading direction.

Each of the lateral transfer arrangements may comprise a cylindrical roller configured to rotate about an axis substantially parallel to the loading direction.

An outer surface of the cylindrical roller may be formed with a first half configured to provide friction with an article thereupon, with a second half having configured to move with negligible friction with respect to an article thereupon.

At least some of the transfer members may comprise one of the lateral transfer arrangements.

All of the transfer members may comprise one of the lateral transfer arrangements.

The elevator unit may be configured to raise and lower the platform unit.

The elevator unit may be configured to raise and lower the container.

The system may further comprise a monitoring system configured to detect parameters of an article on the system. The parameters may be selected from a group including identity, weight, physical dimensions, position, and orientation.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
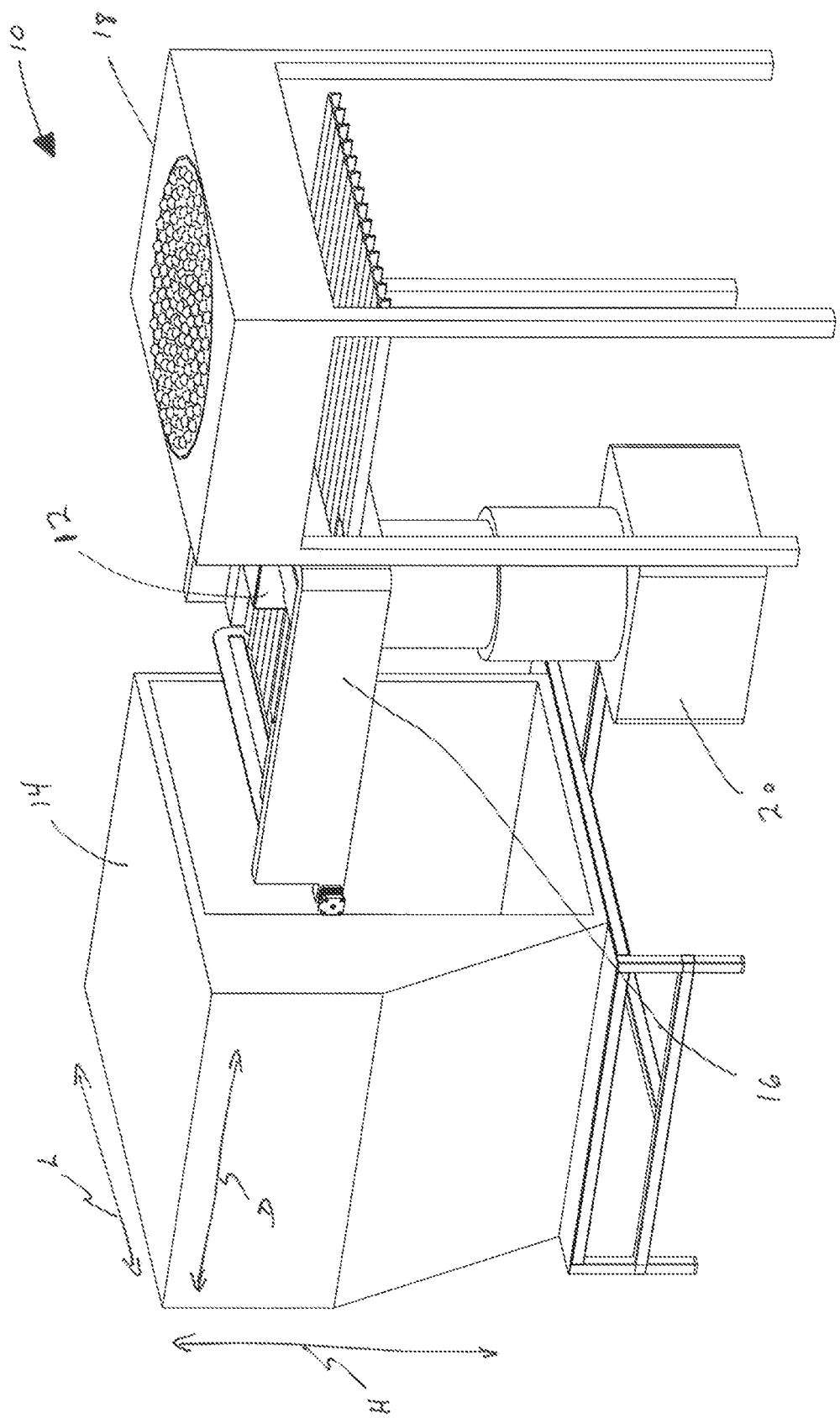
FIG. 1 is a perspective view of a system for loading articles into a container.

As illustrated in FIG. 1, there is provided a system, which is generally indicated at 10, for loading articles 12 into a container 14. It will be appreciated that while the articles are typically pieces of luggage, wherein the container 14 is a unit load device (ULD) for loading onto an aircraft, the system 10 may be used for loading any container with articles according to a predetermined arrangement. In addition, it will be appreciated that while the system 10 is described herein and illustrated in the accompanying figures as being used to load articles 12 having generally rectangular shapes onto a container, it will be appreciated that it may be used to load articles of almost any shape onto a suitable container, mutatis mutandis. The container 14 is characterized by a length along a length axis L, a height along a vertical height axis H, and a depth along a depth axis D.

The system 10 comprises a platform unit 16 and a rotating arrangement 18. It further comprises an elevator system 20, configured to adjust the relative height of the platform unit 16 with respect to the container 14. The elevator system 20 may be configured to selectively raise and lower the platform unit 16 (as shown), and/or to selectively raise and lower the container 14.

The system may further comprise a monitoring system (not illustrated) configured to detect the presence of an article 12 on the system, as well as detect at least some parameters regarding it, which may be one or more of its location, orientation, identity, weight, etc. At least some of the parameters may be provided to the system, wherein the article 12 is provided with a machine-readable identifier (e.g., a barcode, etc.) facilitating identification of the article by the monitoring system, and optionally associating it with the provided parameters. It will be appreciated that the monitoring system may comprise several separate elements, which may be located in different locations of the system 10, each in accordance with its intended function.

In addition, the system 10 comprises a controller (not illustrated) configured to direct its operation. It will be appreciated that while herein the specification and claims, the term "controller" is used with reference to a single element, it may comprise a combination of elements, which may or may not be in physical proximity to one another, without departing from the scope of the presently disclosed subject matter, mutatis mutandis. In addition, disclosure herein (including recitation in the appended claims) of a controller carrying out, being configured to carry out, or other similar language, implicitly includes other elements of the system 10 carrying out, being configured to carry out, etc., those functions, without departing from the scope of the presently disclosed subject matter, mutatis mutandis.

The controller is configured to operate the system 10 such that the articles are loaded onto the container 14 according to a predetermined loading plan, e.g., a three-dimensional arrangement in which each article's position within the space of the container (i.e., its position along the length, height, and depth thereof), as well as its orientation at the position (i.e., its orientation about one or more axes, e.g., a vertical axis being parallel to the height axis H of the container 14) is predefined. The controller may be configured to determine the loading plan according to any suitable method, algorithm, etc., and/or may be configured to be provided with the loading plan, for example from an external system, input by a user, etc.

Figure 2:
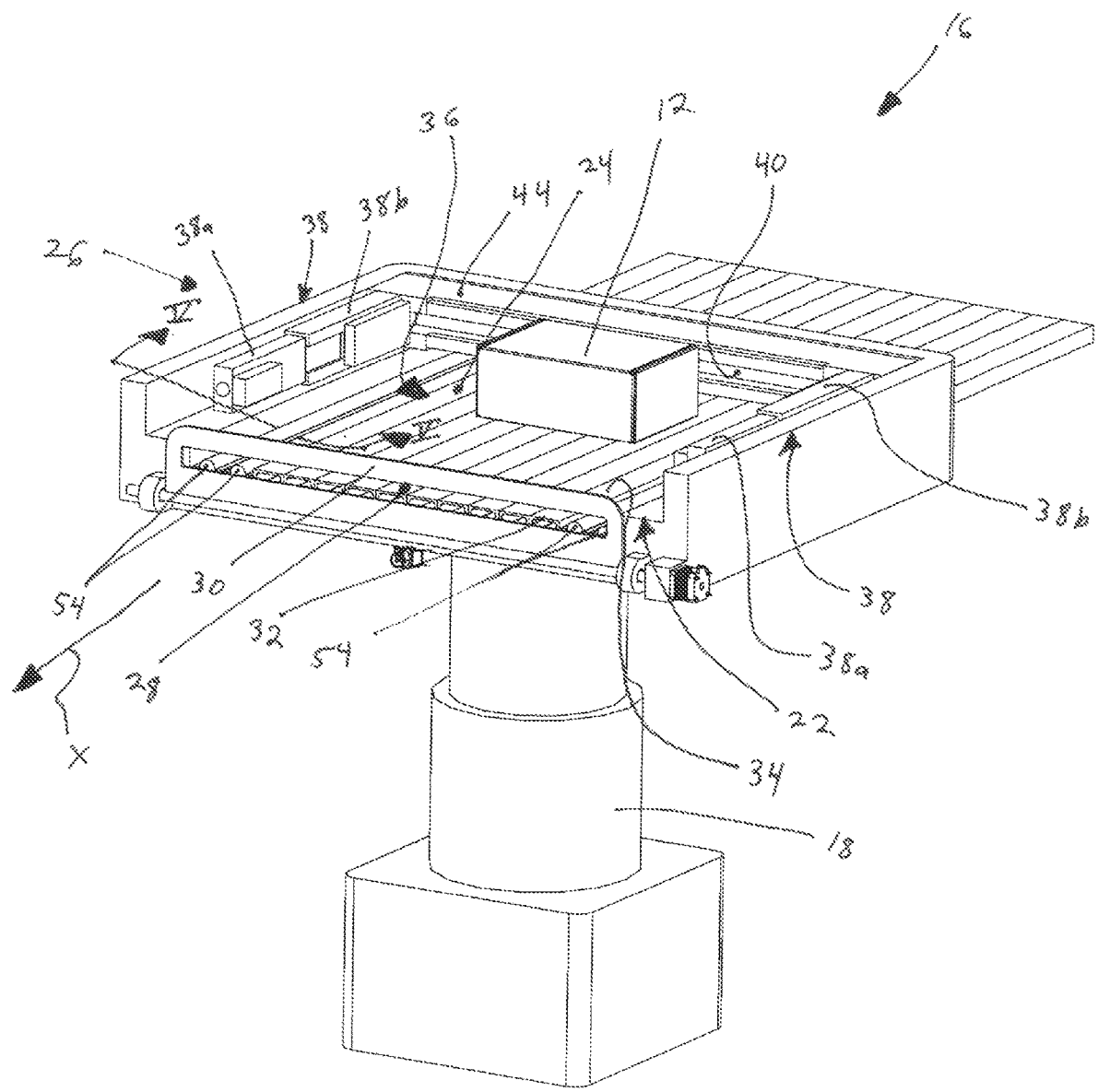
FIG. 2 is a perspective view of a platform unit of the system illustrated in FIG. 1.

The platform unit 16 is configured to bring the article 12 to its predetermined position and orientation within the container 14. Accordingly, as illustrated in FIG. 2, it comprises a transfer arrangement 22 defining a working area 24 thereabove, and a positioning arrangement 26. As opening 28 is defined on one side of the working area 24, for facing the container 14 during loading of articles 12 thereto. A gate 30 may be provided at the opening 28, configured to selectively close and open it (i.e., to respectively block and allow access to the container 14 from the working area 24).

The transfer arrangement 22 comprises a plurality of transfer members 32, each extending along a loading direction, indicated by arrow X, which is substantially perpendicular to the opening 28, e.g., being parallel to the depth axis D of the container 14. Each of the transfer members 32 operates independently of one another. Accordingly, descriptions herein of a transfer member or of transfer members are to be understood as described each of the transfer members individually, unless otherwise clear from context. The transfer members 32 are arranged such that upper surfaces 34 thereof are generally coplanar with one another, thereby constituting a receiving surface 36 of the platform unit 16. The upper surfaces 34 of the transfer members 32 may be textured such that when translated, an article 12 resting thereupon is carried therewith, e.g., they may be knurled, etc., however the article may still be slid thereupon in the presence of a lateral force acting thereupon, for example as will be discussed below.

The system 10 may be intended to operate to load articles 12 into a container 14 selected from one of several known designs. Accordingly, the platform unit 16 may be suitably configured, e.g., the width of the opening 28 may be suited to the length of an opening of the container 14, the transfer members 32 may together span, in a direction along the opening, a distance suitable to the opening of the container, etc., as will be clear from the description below relating to operation of the transfer arrangement 22 to load articles 12 into the container.

Each of the transfer members 32 is configured to translate its upper surface 34 laterally along the loading direction, for example so as to protrude beyond the opening 28 of the working area 24, such that it may extend into the cavity of the container 14 via an open side thereof.

Accordingly, according to some examples, each of the transfer members 32 may be associated with a shifting arrangement (not illustrated), for example comprising one or more motors, configured to selectively shift each of the transfer members laterally along the loading direction, independently of the other transfer members. The shifting arrangement may comprise a motor associated with each of the transfer members 32 to selectively shift it, or one or more motors each associated with several of the transfer members, and comprising a transmission system configured to selectively bring each of the associated transfer members into operational connection with the motor to facilitate its being shifted thereby.

According to other examples, each of the transfer members 32 may comprise a conveyor arrangement configured to selectively transfer an article 12 along the upper surface 34 thereof, e.g., in the loading direction. The conveyor arrangement may comprise, e.g., one or more belts, rollers, or any other suitable apparatus configured to transfer an article 12 with respect to the transfer member 32 along its length.

The positioning arrangement 26 is configured to facilitate rotating an article 12 received thereon to the orientation dictated by the loading plan. In addition, it is configured for positioning the article to the position along the length axis L of the container 14 dictated by the loading plan. According to some examples, the positioning arrangement 26 is configured to rotate an article 12 only about a vertical axis, i.e., it is designed to receive an article which is properly oriented with respect to the depth and length axes D, L of the container.

According to some examples, the positioning arrangement 26 may comprise a pair of guide members 38, the guide members facing one another and being disposed on opposite sides of the working area 24, each on a side which is substantially perpendicular to the opening 28 thereto, i.e., the guide members extend substantially parallel to the loading direction. Each of the guide members 38 may be associated with an actuating arrangement, configured to selectively extend and retract guide members 38 toward each other in a direction substantially perpendicular to the loading direction.

The guide members 38 may be provided according to any suitable design, e.g., in accordance with the intended use thereof, in particular with respect to the physical characteristics of the articles 12 with which the system 10 is designed for use therewith. In general, they may be substantially rigid, but may, according to design requirements, be padded so as to minimize damage to articles 12 during use of the system, for example as will be described below. According to some examples, the guide members 38 may each have a rigid surface, and be configured to be receive a covering (not illustrated) removable mounted thereon. The covering may be, e.g., a padding for example to protect the article 12 and/or the guide member 38 from damage due to impact therebetween.

According to some examples, a rear wall (i.e., opposite the opening 28) of the working area 24 comprises a track 40, configured for receipt therein of the guide members 38. The actuating arrangement is configured to move the guide members within the track. According to other examples (not illustrated), the actuating arrangement comprises one or more telescoping members, each configured to extend and retract.

It will be appreciated that while the actuating arrangement may be provided, according to other examples, comprising other any other suitable mechanisms to facilitate extending and retraction of the guide members 38, for example having shafts (not illustrated) configured to be actuated toward and away from the working area 24, the examples described above facilitate operation of the platform unit 16 without requiring extra space adjacent thereto to accommodate outward movement of elements of the actuating arrangement.

According to some examples, the platform unit 16 may further comprise an auxiliary guide member 44 disposed on an opposite side of the working area 24 from the opening 28, i.e., extending substantially perpendicular to the loading direction. The auxiliary guide member 44 is configured to displace the article 12 along the working area 24 in the loading direction, without deployment of the transfer members 32. The auxiliary guide member 44 may comprise an auxiliary actuating arrangement (not illustrated) configured to selectively extend and retract it in the loading direction. The auxiliary guide member 44 may be provided according to any of the examples described above with reference to the guide members 38 of the positioning arrangement 26, mutatis mutandis.

It will be appreciated that the example illustrated in FIG. 2 is one in which a track 40 in which the guide members 38 move is provided, and is formed in the auxiliary guide member 44. Accordingly, the guide members 38 may be configured to at least partially compress along the loading direction, for example comprising first and second guide member sections 38a, 38b configured to telescopically collapse.

Figure 3:
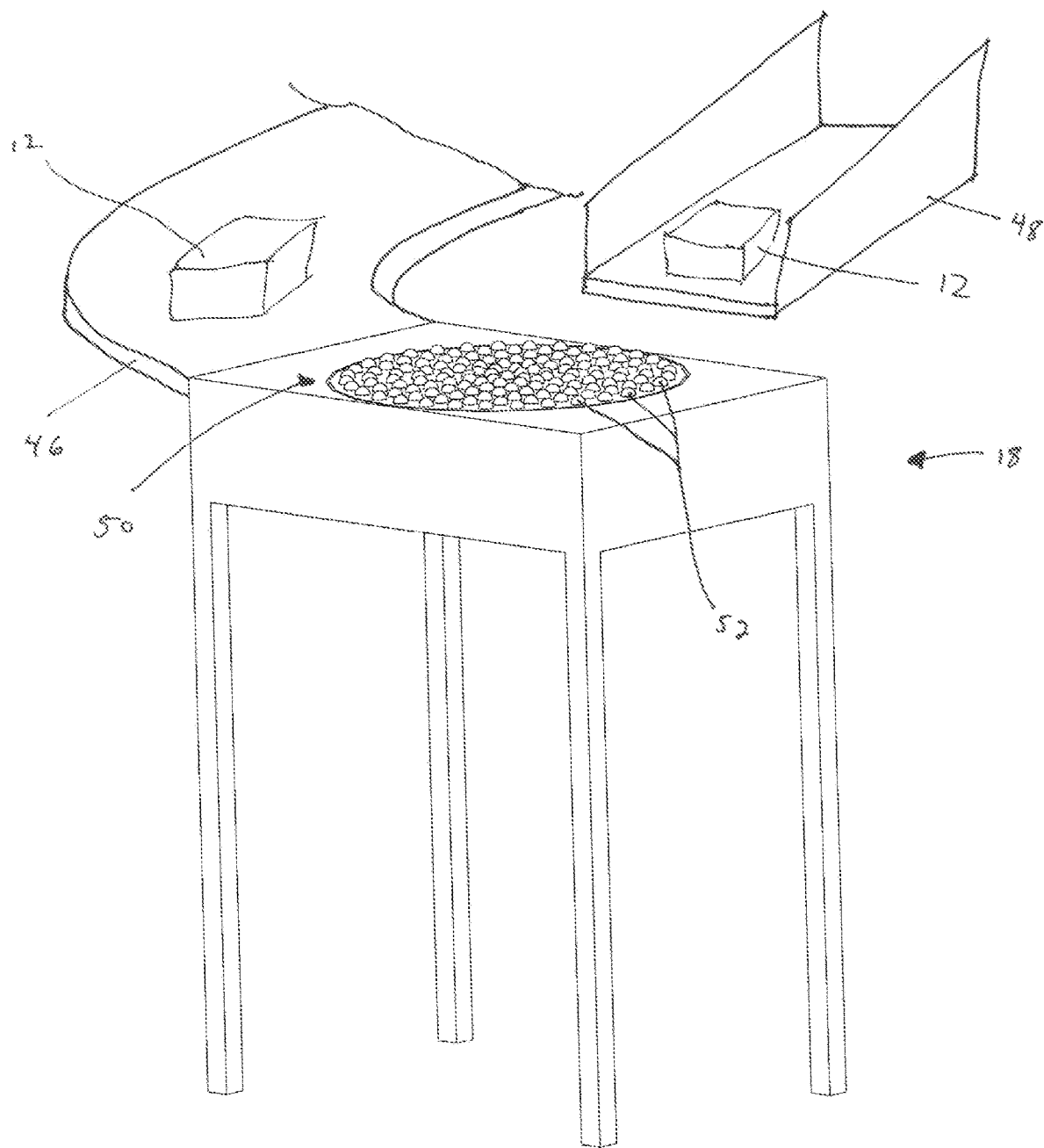
FIG. 3 is a perspective view of a rotating arrangement of the system illustrated in FIG. 1.

The rotating arrangement 18 is configured to rotate an article 12 to a predetermined preliminary orientation, and to transfer it to the receiving surface 36 of the platform unit 16. Accordingly, as illustrated in FIG. 3, it is disposed so as to receive an article 12, e.g., from a luggage sorting and/or storage area for loading onto the container 14. Accordingly, it may be disposed in line with a conveyor system 46, positioned so as receive from a chute 48, etc., as appropriate given the environment.

The rotating arrangement 18 may comprise a rotating interface 50, configured to rotate an article 12 thereupon about a vertical axis, i.e., it is designed to receive an article which is properly oriented with respect to the depth and length axes D, L of the container. The rotating interface 50 may comprise a plurality of rollers 52, e.g., being spherical, configured to cooperate to laterally translate an article on the rotating interface 50. For example, they may cooperate to slide an article 12 received from an adjacent conveyor system 46 to a position substantially in the center of the rotating interface 50, to rotate the article 12 about a vertical axis until its orientation is substantially that defined by the loading plan, and to translate it toward the platform unit 16 such that it is delivered to the working area 24 thereof.

In operation, an article 12 is delivered to the rotating interface 50 of the rotating arrangement 18. Typically, the order in which articles 12 are to be loaded onto the container 14 is dictated by the loading plan; accordingly, the articles 12 are delivered to the rotating interface 50 in the order in which they are to be loaded. The loading plan may be determined given the constraint that articles 12 are to be oriented such that their vertical dimension is the smallest dimension, e.g., pieces of luggage are to be loaded lying on a side thereof, thereby increasing the probability that the article 12 is delivered such that only a rotation about the vertical axis is necessary to orient it in accordance with the loading plan. The rotating interface 50 operates to rotate the article 12 such that its orientation substantially matches that defined by the loading plan. It subsequently operates to deliver the article 12 to the working area 24 of the platform unit 16, wherein it is disposed on the upper surface 36 thereof.

Typically, the guide members 38 of the positioning arrangement 26, as well as the auxiliary guide member 44 according to examples wherein it is provided, are fully retracted when the article 12 is delivered to the working area 24 of the platform unit 16, thereby allowing it to be delivered to any location thereon. Once the article 12 is received on the platform unit 16, the guide members 26 are operated to bring the article 12 to the position along the length axis L of the container 14 defined by the loading plan. This may be accomplished by operating the actuating arrangement to bring one or both of the guide members 38 to positions coinciding with the edges of the article 12 defined by the loading plan.

Besides disposing the article 12 at the proper position along the length axis L, this may serve to fully orient the article about the vertical axis, as small deviations from the orientation are corrected when the article is borne upon from opposite sides thereof by the guide members 38. (Thus, the rotating interface 50 may rotate the article 12 such that its orientation does not exactly match that defined by the loading plan, but only substantially, i.e., to the extent the being borne upon from opposite sides by the guide members will fully rotate it into its proper orientation, and not to some other orientation, e.g., rotated 90° therefrom.)

It will be appreciated that while the upper surfaces 34 of the transfer members 32 are formed so as to provide some friction between itself and the article 12, as mentioned above, the amount of friction is not so much so as to significantly hinder the movement of the article 12 on the receiving surface 36 by the positioning arrangement 26, such as described above.

According examples wherein the platform unit 16 comprises the auxiliary guide member 44, for example as described above, it may be operated to move the article 12 toward the opening 28. This may be done, for example, once the guide members 38 have brought to the article 12 to its position along the length axis L as defined by the loading plan, such as described above. This may be accomplished by operation of the auxiliary actuating arrangement associated with the auxiliary guide member 44 until the article 12 is adjacent the opening 28.

According to examples wherein an auxiliary guide member 44 is provided comprising a track in which the guide members 38 move, the guide members may be operated to bring the article 12 to its position along the length axis L as defined by the loading plan simultaneously with the auxiliary guide member being operated to move the article toward the opening 28.

The elevator system 20 operates to dispose the platform unit 16 such that its height is above the position of the article 12, along the height of the container 14, defined by the loading plan. This may be accomplished, as mentioned above, by moving the platform unit 16 and/or the container 14 vertically. It will be appreciated that the vertical movement effected by the elevator system 20 may be performed at any suitable time before or after the article 12 is delivered to the working area 24 of the platform unit 16.

Once the article 12 is disposed in the position along the height and length of the container 14 defined by the loading plan, and is positioned at the orientation defined by the loading plan, for example as described above, the transfer arrangement 22 operates to positing the article to the position along the depth of the container defined by the loading plan, thereby loading the article therein. According to some examples, the shifting arrangement operates to extend at least some of the transfer members 32 on which the article 12 is disposed into the cavity of the container 14. This may be accomplished by extending only those transfer members 32 which are fully within that portion of the length of the container 14 in which the article 12 is to be placed according to the loading plan, i.e., only those transfer members on which the article is disposed.

It will be appreciated that by providing a system with a plurality of transfer members 32 as described, and which is configured to extend only the necessary ones into the container 14 to load a particular article 12, the amount of space required within the container to accommodate therein elements of the system during packing is reduced, for example when compared with a packing system which utilizes loading arm of a single size to load articles within the container. Accordingly, the loading plan may be able to include more articles 12 in a single container 14, compared with a loading plan which is determined for execution by a different kind of system.

Once the article 12 has been brought to the proper depth of the container 14 as defined by the loading plan, the shifting arrangement operates to retract the transfer members 32. The retraction of the transfer members 32 may be performed one at a time, such that the frictional force between the article 12 and the still-extended transfer members is greater than that between the article and the transfer member being retracted, so that the retracting transfer member does not displace the article from its place within the container 14. The transfer members 32 may be retracted in sequence from one side of the article (along the length of the container) to the other, such that once a sufficient number of transfer members have been retracted, the article will tip onto the articles already loaded into the container, providing the necessary friction with the article being loaded such that the last transfer members may be removed without displacing the article from its place within the container.

According to some examples, at least some of the transfer members 32 are configured to be lowered slightly before being retracted, thereby allowing them to be retracted without any friction with the article.

According to examples wherein the transfer members 32 comprise conveyor arrangements configured to laterally transfer the article 12 along the upper surface 34 thereof, the conveyor arrangement associated with each of the transfer members may operate to move the article with respect thereto at the same rate and in an opposite direction of the retraction. Thus, the net effect on the article 12 of the retraction of the transfer member 32 and the operation of the conveyor arrangement is null, thereby at least partially eliminating the effect of friction, as described above. Such an arrangement may allow more of the transfer members 32 to be retracted at once. According to some examples, once the article 12 has been brought to the depth within the container 14 defined by the loading plan, all of the transfer members 32 retract simultaneously, with the conveyor arrangements operating to maintain the article at its position as described above.

According to some examples, the gate 30 may be closed, i.e., blocking the opening 28, until the article 12 is disposed in the position along the height and length of the container 14 defined by the loading plan, i.e., until the system 10 is ready to deploy the transfer members 32 to bring the article to its location within the container 14, at which point the gate is opened.

Figure 4:
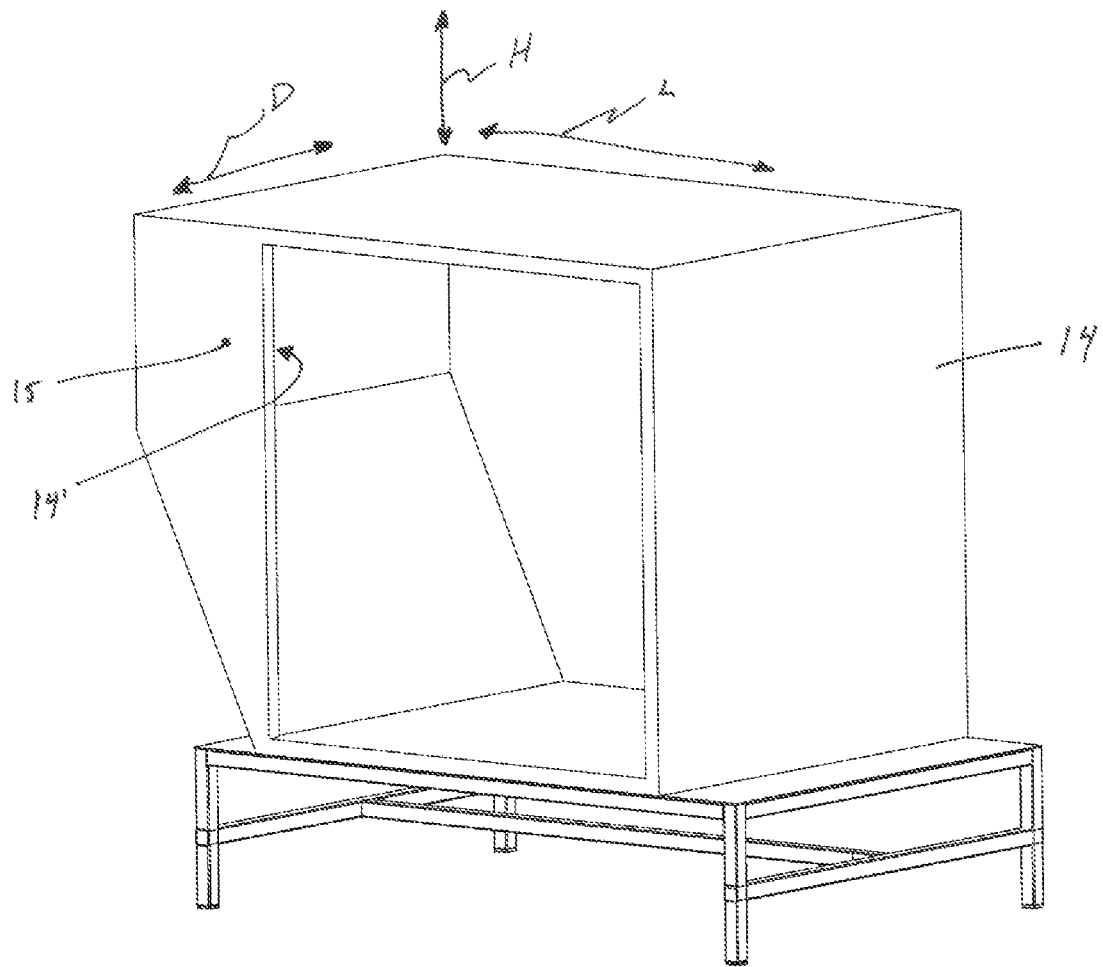
FIG. 4 is a perspective view of an example of a container for loading articles therein using the system illustrated in FIG. 1.

The system 10 may be configured to load articles 12 into a container 14 wherein at least a portion thereof is not directly accessible along the depth axis D thereof, for example as illustrated in FIG. 4. According to some examples, the container 14 may comprise an annex 14' extending sidewardly (i.e., in the direction of the length axis L), access thereto being blocked along the depth axis D by a portion of the wall 15 of the container. Accordingly, loading articles into the annex 14' is not possible using the transfer members 32 as described above.

Accordingly, reverting to FIG. 1, the platform unit may comprise one or more lateral transfer arrangements, generally indicated at 54, configured to move an article 12, which is disposed on transfer member 32 extended into the cavity, in a lateral direction parallel to the length axis L of the container 14. Each lateral transfer arrangements 54 may constitute a portion of one of the transfer members 32.

Figure 5:
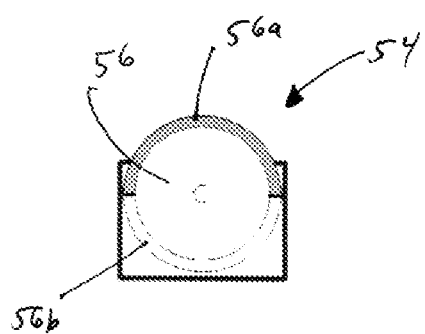
FIG. 5 is a cross-sectional view, taken along line V-V in FIG. 2, of a lateral transfer arrangement of the system illustrated in FIG. 1.

As illustrated in FIG. 5, according to some examples each of the lateral transfer arrangements 54 comprises a cylindrical roller 56 extending along and configured to rotate about a roller axis extending substantially in the loading direction.

According to some examples, an outer surface of the cylindrical roller 56 is formed with a first half 56a thereof configured to provide friction with an article 12 thereupon, and a second half 56b thereof having a smooth surface configured to move with negligible friction with respect to an article thereupon, i.e., without substantially affecting the movement of the article.

According to other examples (not illustrated), the entire outer surface of the cylindrical roller 56 is formed so as to provide friction with an article 12 thereupon. The cylindrical roller 56 may be configured to selectively rotate freely or be driven, thereby facilitating selectively allowing movement of an article 12 by the lateral transfer arrangement 54 or free movement of the article therealong.

A motor unit (not illustrated) may be provided configured to selectively rotate each of the cylindrical rollers 56.

According to some examples, lateral transfer arrangements 54 are provided at each of the ends of the working area 24, i.e., adjacent opposite ends of the opening 28 thereto, for example constituting a portion of one or more of the transfer members 32 of each end of the transfer arrangement 22. According to other examples, each of the transfer members 32 of the transfer arrangement 22 comprises a lateral transfer arrangement 54. According to some examples, the lateral transfer arrangements 54 may comprise a plurality of spherical rollers, and may thus also constitute a conveyor arrangement as described above. Each of the spherical rollers may be formed as described above, i.e., with one hemisphere thereof configured to provide friction with an article 12 thereupon, and a second hemisphere thereof having a smooth surface configured to move with negligible friction with respect to an article laying thereon.

In operation, the loading plan defines articles 12 to be loaded into the annex 14' of the container 14. When such an article 12 is delivered to the working area 24 of the platform unit, the positioning arrangement 26 operates to position it on the lateral transfer arrangements 54. The transfer members 32 on which the article is disposed, at least some of which comprise a lateral transfer arrangement 54, are extended into the container 14. The lateral transfer arrangements 54 operate to move the article 12 along the length axis L of the container 14 toward the annex 14'. Typically, this will be done once at least some of the articles 12 have been arranged within the container 14 as described above, such that the arrangement of articles constitutes a barrier adjacent the annex 14'.

As mentioned, the controller may be configured to operate the system 10 such that the articles are loaded onto the container 14 according to a predetermined loading plan. Accordingly, the system 10 may be designed to expect that the articles 12 arrive in a predetermined order. The controller may thus be configured to verify that each article 12 provided thereto is the one which is expected according to the loading plan. Accordingly, it may be configured to compare the article 12 identified by the monitoring system with that which is expected at a given point during a loading operation. This may be, e.g., based on information provided by machine-readable identifier associated with the article 12. According to some examples, the controller is further configured to identify, using information regarding physical parameters of the article 12 detected by the monitoring system, whether the information provided thereto regarding the article is correct. For example, the controller may validate the identity of a given article 12, but identify that its physical dimension do not match those which were used to determine the loading plan; the controller may be configured to return an error code, for example halting loading of the container 14, alerting a user, etc.

Those skilled in the art to which this invention pertains will readily appreciate that numerous changes, variations, and modifications can be made without departing from the scope of the presently disclosed subject matter, mutatis mutandis.

The invention claimed is:

1. A system for facilitating loading of articles into a container, the system comprising:
a platform unit and an elevator unit configured to adjust its elevation relative to said container, said platform unit comprising:
an opening for facing said container and defining a container-facing edge of the platform unit;
a transfer arrangement comprising a plurality of parallely-arranged transfer members, each transfer member extending along a loading direction being transverse to said container-facing edge and each of said transfer members being configured to extend in the loading direction through said opening independently of the others, upper surfaces of the transfer members defining a receiving surface of the platform unit configured for receipt thereon of at least one of said articles; and
a positioning arrangement configured to orient said article to a predetermined loading orientation on said receiving surface and position said article at a predetermined loading position along an axis perpendicular to said loading direction;
wherein said transfer arrangement is configured to extend a subset of said transfer members in the loading direction through said opening, thereby facilitating placement of said article at a predetermined location within said container.

2. The system according to claim 1, wherein said subset is limited to those transfer members supporting the article when extended.

3. A system for facilitating loading of articles into a container, the system comprising:
a platform unit and an elevator unit configured to adjust its elevation relative to said container, said platform unit comprising:
an opening for facing said container and defining a container-facing edge of the platform unit;
a transfer arrangement comprising a plurality of parallely-arranged transfer members, each transfer member extending along a loading direction being transverse to said container-facing edge and each of said transfer members being configured to extend in the loading direction through said opening independently of the others, upper surfaces of the transfer members defining a receiving surface of the platform unit configured for receipt thereon of at least one of said articles; and
a positioning arrangement configured to orient said article to a predetermined loading orientation on said receiving surface and position said article at a predetermined loading position along an axis perpendicular to said loading direction;
wherein said transfer arrangement is configured to extend a subset of said transfer members in the loading direction through said opening, thereby facilitating placement of said article at a predetermined location within said container;

being configured to retract the transfer members one at a time once the article has been placed at the predetermined location.

4. The system according to claim 3, being configured to lower each of said transfer members before its retraction.

5. The system according to claim 1, wherein each of said transfer members comprises a conveyor arrangement configured to transfer an article thereupon along said loading direction.

6. The system according to claim 1, wherein said positioning arrangement comprises a pair of guide members extending in the loading direction and facing one another, the positioning arrangement being configured to selectively extend and retract said guide members toward each other in a direction transverse to the loading direction.

7. The system according to claim 6, wherein said positioning arrangement comprises an actuating arrangement configured to facilitate the extension and retraction of each of the guide members.

8. The system according to claim 7, further comprising a track extending in a direction transverse to the loading direction and receiving said guide members therewithin, said actuating arrangement being configured to move the guide members within said track.

9. The system according to claim 1, further comprising an auxiliary guide member, configured to displace the article toward said opening in the loading direction, independently of said transfer members.

10. The system according to claim 8, further comprising an auxiliary guide member configured to displace the article toward said opening in the loading direction independently of said transfer member, and wherein said track is formed in said auxiliary guide member.

11. The system according to claim 10, wherein said guide members are configured to compress along the loading direction.

12. The system according to claim 11, wherein said guide members are configured to telescopically collapse.

13. The system according to claim 1, wherein said platform unit further comprises a gate disposed so as to selectively open and close said opening.

14. The system according to claim 1, further comprising a rotating arrangement, configured to rotate the article to a predetermined preliminary orientation and transfer it to said platform unit.

15. The system according to claim 14, wherein said rotating arrangement comprises a plurality of rollers configured to selectively rotate and laterally translate said article.

16. A system for facilitating loading of articles into a container, the system comprising:
  a platform unit and an elevator unit configured to adjust its elevation relative to said container, said platform unit comprising:
    an opening for facing said container and defining a container-facing edge of the platform unit;
    a transfer arrangement comprising a plurality of parallely-arranged transfer members, each transfer member extending along a loading direction being transverse to said container-facing edge and each of said transfer members being configured to extend in the loading direction through said opening independently of the others, upper surfaces of the transfer members defining a receiving surface of the platform unit configured for receipt thereon of at least one of said articles; and
    a positioning arrangement configured to orient said article to a predetermined loading orientation on said receiving surface and position said article at a predetermined loading position along an axis perpendicular to said loading direction;
  wherein said transfer arrangement is configured to extend a subset of said transfer members in the loading direction through said opening, thereby facilitating placement of said article at a predetermined location within said container;
  the system further comprising one or more lateral transfer arrangements configured to move an article disposed on said subset of transfer member when extended into the container, in a lateral direction substantially perpendicular to said loading direction.

17. The system according to claim 16, wherein each of said lateral transfer arrangements comprising a cylindrical roller configured to rotate about an axis substantially parallel to the loading direction.

18. The system according to claim 17, wherein said cylindrical roller includes an outer surface formed with a first half configured to provide friction with an article thereupon, and a second half having configured to move with negligible friction with respect to an article thereupon.

19. The system according to claim 16, wherein at least some of said transfer members comprise one of said lateral transfer arrangements.

20. The system according to claim 1, said elevator unit being configured to raise and lower the platform unit.

* * * * *